(12) United States Patent
Abreu et al.

(10) Patent No.: US 8,150,441 B2
(45) Date of Patent: Apr. 3, 2012

(54) MODIFYING A SIGNAL BY CONTROLLING TRANSMIT DIVERSITY PARAMETERS

(75) Inventors: Eduardo Abreu, Allentown, PA (US); Haim Harel, New York, NY (US); Kenneth Kludt, Annadale, NJ (US); Yair Karmi, Bridgewater, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 888 days.

(21) Appl. No.: 11/592,969

(22) Filed: Nov. 6, 2006

(65) Prior Publication Data

US 2008/0123775 A1 May 29, 2008

(51) Int. Cl.
*H04M 1/00* (2006.01)

(52) U.S. Cl. ....... 455/522; 455/69; 455/456; 455/456.6; 455/411; 455/565; 375/299; 375/146; 375/213; 375/211

(58) Field of Classification Search ........... 455/63.1, 455/63.4, 69, 101, 411, 456.6, 522, 67.11, 455/67.13, 103, 126, 526; 375/299, 146, 375/211, 213, 267
See application file for complete search history.

(56) References Cited

U.S. PATENT DOCUMENTS

| | | | |
|---|---|---|---|
| 5,634,199 A | 5/1997 | Gerlach et al. | |
| 5,642,353 A | 6/1997 | Roy, III et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |
| 0,128,026 A1 | 9/2002 | Derryberry et al. | |
| 0,141,331 A1 | 10/2002 | Mate et al. | |
| 6,492,942 B1 | 12/2002 | Kezys | |
| 0,148,770 A1 | 8/2003 | Das et al. | |
| 6,636,495 B1 | 10/2003 | Tangemann | |
| 0,215,006 A1 | 11/2003 | Raghothaman | |
| 6,694,155 B1 * | 2/2004 | Chin et al. | 455/562.1 |
| 6,704,370 B1 | 3/2004 | Chheda et al. | |

(Continued)

FOREIGN PATENT DOCUMENTS

EP 0 986 193 3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner* — Edward Urban
*Assistant Examiner* — Ganiyu Hanidu
(74) *Attorney, Agent, or Firm* — Pearl Cohen Zedek Latzer, LLP

(57) ABSTRACT

A feedback signal is received from a feedback communication device. The feedback signal provides feedback information for a signal at a feedback rate. A modifying communication device modifies the signal by adjusting a nominal value of a transmit diversity parameter in accordance with the feedback information at a nominal value adjustment rate. The signal is perturbed according to the adjusted nominal value at a perturbation rate.

39 Claims, 7 Drawing Sheets

U.S. PATENT DOCUMENTS

| | | | |
|---|---|---|---|
| 6,745,009 | B2 | 6/2004 | Raghothaman |
| 6,754,473 | B1 | 6/2004 | Choi et al. |
| 0,127,257 | A1 | 7/2004 | Raghothaman et al. |
| 6,788,685 | B1 * | 9/2004 | Holtzman et al. ............ 370/391 |
| 6,810,264 | B1 | 10/2004 | Park et al. |
| 6,816,557 | B2 * | 11/2004 | Kuchi et al. ................... 375/299 |
| 6,842,632 | B2 * | 1/2005 | Raghothaman et al. ... 455/562.1 |
| 6,845,246 | B1 * | 1/2005 | Steer .............................. 455/522 |
| 6,859,643 | B1 | 2/2005 | Ma et al. |
| 6,865,377 | B1 | 3/2005 | Lindskog et al. |
| 6,882,228 | B2 | 4/2005 | Rofougaran |
| 6,892,059 | B1 | 5/2005 | Kim et al. |
| 6,952,455 | B1 | 10/2005 | Banister |
| 6,970,438 | B2 | 11/2005 | Mate et al. |
| 7,010,318 | B2 | 3/2006 | Chang et al. |
| 0,084,388 | A1 | 4/2006 | Li et al. |
| 7,054,639 | B2 | 5/2006 | Lin et al. |
| 0,267,983 | A1 | 11/2006 | Karmi et al. |
| 7,200,368 | B1 * | 4/2007 | Hottinen et al. ............. 455/101 |
| 7,242,954 | B2 * | 7/2007 | Lehtinen et al. ............. 455/522 |
| 7,391,831 | B2 * | 6/2008 | Lim ............................... 375/347 |
| 7,409,191 | B2 * | 8/2008 | Azuma ......................... 455/103 |
| 7,499,709 | B2 | 3/2009 | Das et al. |
| 7,515,878 | B2 * | 4/2009 | Zhang et al. .................... 455/69 |
| 7,660,598 | B2 | 2/2010 | Barnett et al. |
| 7,729,714 | B2 | 6/2010 | Black et al. |
| 7,783,267 | B1 | 8/2010 | Harel et al. |
| 2003/0002594 | A1 * | 1/2003 | Harel et al. ................... 375/299 |
| 2003/0112880 | A1 | 6/2003 | Walton et al. |
| 2004/0048584 | A1 | 3/2004 | Vaidyanathan et al. |
| 2004/0085239 | A1 | 5/2004 | Ukena et al. |
| 2004/0110473 | A1 * | 6/2004 | Rudolf et al. ................... 455/69 |
| 2004/0198269 | A1 * | 10/2004 | Phillips ......................... 455/126 |
| 2004/0252797 | A1 | 12/2004 | Lee |
| 2005/0058216 | A9 | 3/2005 | Nafie et al. |
| 2005/0059355 | A1 | 3/2005 | Liu |
| 2005/0130597 | A1 | 6/2005 | Li et al. |
| 2005/0143113 | A1 | 6/2005 | Lee et al. |
| 2005/0164645 | A1 | 7/2005 | Li et al. |
| 2005/0239419 | A1 * | 10/2005 | Fudaba et al. ................ 455/101 |
| 2006/0270359 | A1 | 11/2006 | Karmi et al. |
| 2008/0049554 | A1 | 2/2008 | Crice et al. |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 02/099999 | 12/2002 |
| WO | WO 03/090386 | 10/2003 |
| WO | WO 2004/045108 | 5/2004 |
| WO | WO 2005/081444 | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US07/23231 mailed Apr. 21, 2008.

"Physical Layer Standard for CDMA2000 Spread Spectrum Systems", Release C, 3G, $3^{rd}$ Generation Partnership Project 2 "3GPP2", 3GPP2 C.S0002-C, Version 1.0, pp. 2-42 thru 2-68 plus cover.

International Search Report for International Application No. PCT/US2006/019228 mailed Sep. 27, 2006.

International Search Report for International Application No. PCT/US2006/018734 mailed Sep. 27, 2006.

Supplementary European Search Report for Application No. EP 07 86 1694 mailed Jun. 10, 2011.

* cited by examiner

MODIFYING A SIGNAL BY CONTROLLING TRANSMIT DIVERSITY PARAMETERS

FIELD OF THE INVENTION

This invention relates generally to the field of wireless communications and more specifically to modifying a signal by controlling transmit diversity parameters.

BACKGROUND

A modifying communication device may have multiple antenna elements that transmit signals to communicate information. A feedback communication device may extract information from the transmitted signals. Multiple antenna elements may enhance spectral efficiency, allowing for more users to be simultaneously served over a given frequency band. The transmitted signals, however, propagate along different paths and may reach the receiving communication device with different phases that destructively interfere. It is generally desirable to reduce interference of transmitted signals.

SUMMARY OF THE DISCLOSURE

In accordance with the present invention, disadvantages and problems associated with previous techniques for modifying signals may be reduced or eliminated.

According to one embodiment of the present invention, a feedback signal is received from a feedback communication device. The feedback signal provides feedback information for a signal at a feedback rate to the modifying communication device. Based on information in the feedback signal, the modifying communication device may modify the transmission parameters, for example, by adjusting a nominal value of a transmit diversity parameter in accordance with the feedback information. The modifying communication device may adjust the transmit diversity parameter, or decide whether to adjust the transmit diversity parameter, at a nominal value adjustment rate. The nominal value adjustment rate may be substantially equivalent to the feedback rate, herein designated as full rate control, or the nominal value adjustment rate may be lower than the feedback rate, herein designated as fractional rate control. For certain conditions, a fractional rate control may provide advantages in stability and overall performance.

The signal may be perturbed at a perturbation rate with reference to the adjusted nominal value. The perturbation rate may be substantially equivalent to or lower than the feedback rate.

Certain embodiments of the invention may provide one or more technical advantages. A technical advantage of one embodiment may be that a nominal value adjustment may be determined according to a perturbation technique. According to an example of a perturbation technique, feedback information may be obtained for a first modulation applied to a signal in a first direction for a particular feedback interval, and a second modulation in a second direction for the subsequent feedback interval. It will be understood that modulation for purposes of perturbation refers to modulating the signal in a way that does not affect data modulation of the signal. If the feedback information indicates an improvement in the received signal for one modulation direction as compared to the other direction, the next nominal value adjustment may be made in that direction. For example, if the feedback information indicates a higher quality in response to a first modulation and a lower quality in response to a second modulation, the next nominal value adjustment may be made in the direction of the first modulation associated with the higher quality.

Embodiments of the invention may be applied independent of the use of the quality indicators in a specific system, such as the power control of CDMA and WCDMA systems; some embodiments of the invention may be integrated with the use of the quality indicators into a combined response to the quality indicator. The former embodiment may have the advantage of being transparent to the network and have little or substantially no impact on the specific interface as defined by the standards; the latter embodiment may have impact on other units in the network and may require modification of the standards.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
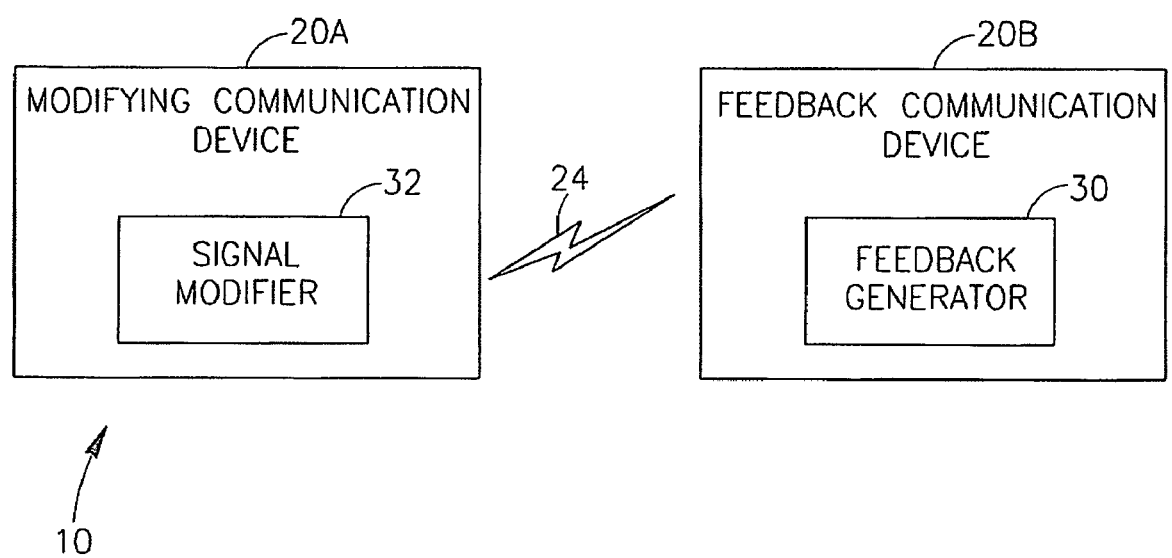
FIG. 1 is a block diagram illustrating one embodiment of a communication network that includes a modifying communication device that adjusts a nominal value of a transmit diversity parameter.

FIG. 1 is a block diagram illustrating one embodiment of a communication network 10 that includes a modifying communication device 20a that that adjusts a nominal value of a transmit diversity parameter. According to the embodiment, modifying communication device 20a perturbs a signal at a perturbation rate and transmits the signal to feedback communication device 20b. Feedback communication device 20b returns feedback information that describes the signal as received by feedback communication device 20b. Modifying communication device 20a adjusts a nominal value of a transmit diversity parameter at a nominal value adjustment rate based on the feedback information.

According to the illustrated embodiment, network 10 operates to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network 10 may include one or more modifying communication devices 20a and one or more feedback communication devices 20b that communicate via a wireless link 24. Either or both of communication devices 20a or 20b may be any device operable to communicate information via signals with one or more other communication devices. For example, communication device 20a or 20b may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

Either or both of communication devices 20a or 20b may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 20a and 20b such as wireless link 24 may be a radio frequency link that is cellular in network organization. Wireless link 24 may be used to communicate a signal between communication devices 20a and 20b.

As described more fully below, according to embodiments of the present invention, modifying communication device 20a may include a signal modifier 32 that modifies one or more signals. Feedback communication device 20b may include a feedback generator 30 that generates a feedback signal that indicates the quality of the modified signal as received at the feedback communication device 20b. Signal modifier 32 may then modify the transmit signal in accordance with feedback information corresponding to the feedback signal.

According to one embodiment, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 20a. According to one embodiment, modifying a signal may be described as adjusting a nominal value of a transmit diversity parameter. As described more fully herein, according to an embodiment of the invention, modulation of a transmit diversity parameter during a perturbation cycle may comprise transmitting using a transmit diversity parameter deviating from the nominal value in a first direction during a first portion of the perturbation cycle and then transmitting using a transmit diversity parameter deviating from the nominal value in a second direction during a second portion of the perturbation cycle.

According to one embodiment of operation of the invention, modifying communication device 20a may modify a signal by perturbing the signal. Perturbing a signal may refer to modulating a signal feature of the signal in relation to a nominal value of the signal, for example, modifying the signal feature in a first direction for a first feedback interval, and in a second direction for another feedback interval. A perturbation cycle may refer to a first modulation in a first direction and a second modulation in a second direction. In some embodiments of the invention, a perturbation cycle may comprise a different, e.g., longer or more complex, sequence of modulations. As an example with respect to phase, a perturbation may include modulating the phase difference in a first direction, and modulating the phase difference in a second direction. If the feedback information provided by the feedback communication device 20b indicates an improvement in the signal received using one perturbation modulation direction compared to the signal received using the other perturbation modulation direction, the next nominal value adjustment may be made in the improved direction in an amount less than or equal to the modulation.

According to embodiments of the invention, the nominal value of a transmit diversity parameter may be perturbed at a first rate, designated the perturbation rate, and the nominal value of the transmit diversity parameter may be adjusted at a second rate, designated the nominal value adjustment rate. The perturbation rate and the nominal value adjustment rates may be the substantially the same or they may be different, and each one may be substantially the same or different than the feedback rate.

According to one embodiment, modifying communication device 20a may perturb a signal at a perturbation rate. A perturbation rate may refer to the frequency at which the signal feature is modulated in any way, e.g., the rate at which relative phase is modified, and may be expressed relative to another rate. For example, the perturbation rate may be expressed relative to the feedback rate, e.g., the rate at which feedback information is obtained from a feedback signal from feedback communication device 20b. In one embodiment of the invention, modifying communication device 20a may perturb the signal at a perturbation rate substantially equivalent to the feedback rate. It will be noted that typically, a full perturbation cycle includes perturbation in a first direction and perturbation in a second direction. Thus, for example, where a perturbation is applied once per feedback interval, the perturbation cycle may span two feedback intervals. In another embodiment of the invention, the perturbation rate may be lower than the feedback rate. Thus, for example, if the perturbation rate is one-fourth the feedback rate, then a full perturbation cycle may include for a first four feedback intervals, transmitting using a transmit diversity parameter with a nominal value that is modified by a perturbation in a first direction, and for a subsequent four feedback intervals, transmitting using a transmit diversity parameter with a nominal value that is modified by a perturbation in a second direction. In this example, a full perturbation cycle may take eight feedback intervals.

As another example, modifying communication device 20a may perturb the signal at a perturbation rate less than the feedback rate, e.g., substantially equivalent to a fraction of the feedback rate, where a fraction may refer to the inverse of an integer, a rational number, an irrational number, or any other suitable mathematical representation. According to one embodiment, a perturbation rate may be substantially equivalent to 1/N of the feedback rate, where N represents the number of feedback intervals for each perturbation, which in some embodiments may be for example, 2, 4, 8, 10, 16, 20, or any integer. The perturbation rate may be substantially equivalent to, for example, one-half of the feedback rate, in which case a perturbation may be applied once per two feedback intervals, such that the perturbation cycle spans four feedback intervals.

Signal modifier 32 may use feedback information to adjust a nominal value of a transmit diversity parameter. Feedback information may be obtained in any suitable manner, for example, from a feedback signal from feedback communication device 20b. A feedback signal may refer to any signal that includes one or more outcome values. An outcome value may refer to an indicator that describes a quality of a signal transmitted by modifying communication device 20a as received by feedback communication device 20b. For example, based on the parameter being modulated, a "quality up" outcome value may instruct modifying communication device 20a to increase the total power of its transmitted signal, and a "quality down" outcome value may instruct modifying communication device 20a to decrease the total power. An outcome value may comprise, for example, a power control bit of a CDMA power control signal, for which "0" represents a command to increase power and a "1" represents a command to decrease power. Thus, for example, a bit value of "1" requesting a decrease in power may indicate "quality up," and a bit value of "0" requesting an increase in power may indicate "quality down." Some CDMA or W-CDMA protocols may allow for additional outcomes, for example, no change in power.

Modifying communication device 20a may receive feedback information from multiple feedback communication devices 20b, in which case modifying communication device 20a may modify the signal to each of the plurality of feedback communication devices 20b in accordance with the combination of feedback information it received. Modifying communication device 20a may modify the signal globally based on the aggregation of feedback signals or it may individually modify the signals send to each feedback communication device respectively based on feedback received from that device.

Signal modifier 32 may process one or more outcome values as an outcome sequence. An outcome sequence may refer to an arrangement of one or more outcome values in a logical order. For example, a binary outcome value may be 0 or 1. In an outcome sequence having two outcome values, the two outcome values may be represented by one of four possible outcome sequences, e.g., 00, 01, 10, 11, where the first bit of the sequence may represent the outcome value associated with a first modulation and the second bit may represent the outcome value associated with a second modulation. Thus, for example, if the perturbation rate is one-fourth the feedback rate, there may be four outcome values for each perturbation, and eight outcome values for a full perturbation cycle.

Feedback information may be obtained directly or indirectly from the feedback signal. In one example, signal modifier 32 may directly determine the outcome values from the feedback signal. In another example, signal modifier 32 may indirectly determine the outcome values from a signal that is generated in response to the feedback signal. In one example, the outcome values may be indirectly determined from a power control signal that is generated in response to the feedback to control power in accordance with the outcome values.

According to one embodiment, signal modifier 32 may receive feedback information at a feedback rate. A feedback rate may refer to the frequency of outcome values. Intervals in the feedback information may be established in order to synchronize signal modifications with feedback describing the modified signal. An interval may refer to any time unit that indicates boundaries in the feedback information. As an example, feedback information may be subdivided into intervals of 1.25 ms. Signal modifier 32 may adjust a signal once per interval. Adjusting the signal once per interval may synchronize the adjustments with feedback information describing the quality of the signal in response to the adjustments.

According to one embodiment, modifying communication device 20a may make a decision to adjust a nominal value of a transmit diversity parameter in any suitable manner based on information derived from the feedback signal. For example, a feedback signal may indicate an improvement in one perturbation direction compared to the other direction, in which case, the nominal value may be adjusted in that one direction in an amount less than or equal to the perturbation. In some cases, no adjustment may be made to preserve the nominal value. In one embodiment of the invention, instructions to signal modifier 30 based on the feedback signal may specify an action such as "adjust up," "adjust down," "no change," or any other suitable action. An "adjust up" action may adjust a nominal value in a positive direction. An "adjust down" action may adjust a nominal value in a negative direction. A "no change" action may preserve a nominal value. Other embodiments may provide other or more detailed instructions, such as, for example, specifying an amount by which the nominal value of the parameter should be adjusted up or down.

One or more outcomes may be used to make a decision on modifying the nominal value.

In one embodiment, designated non-continuous perturbation, each outcome may be applied once in the nominal value decision process. In the next decision process, newly received feedback signals may be considered and previously used feedback signals may be discarded, such that feedback signals are used to make only one decision. It will be understood that each decision may be based on one or more feedback signals. Thus, as a general example of non-continuous perturbation, a decision on a nominal value may be made using any integer N outcomes, e.g., N=4, which are only used once to decide whether to adjust a nominal value. In such case, the nominal value adjustment rate will be at most 1/N of the rate at which outcomes become available. N may be any integer, for example, 2, 4, 8, 16, or more.

In another embodiment, designated continuous perturbation, multiple outcomes may determine the adjustment (or preservation) of the nominal value. Thus, for example, a string of the past five feedback signals may be analyzed to determine an adjustment. Then, for the next decision on a next nominal value, one or more newly received outcomes may be used, replacing a number of previously received outcomes, which may be discarded, while some recent outcomes, which may have been used making in one or more past decisions, may be reused to make the present decision. As a general example of continuous perturbation, a decision on a nominal value may be made using N outcomes. A new nominal value decision may be made after M new outcomes become available. Thus, for example, if N=4 and M=2, the nominal value decision rate may be 1/M (e.g., 1/2) of the rate at which outcomes become available.

The nominal value may be adjusted at a nominal value adjustment rate. Embodiments of the invention may allow for different perturbation rate and nominal value adjustment rate. A nominal value adjustment rate may refer to the frequency of nominal value adjustments. The nominal value adjustment rate may be equal to, higher than, or lower than the feedback rate, their ratio being any number, rational or irrational. For example, one adjustment may be made at every feedback interval, and thus the nominal value adjustment rate may be substantially equivalent to the feedback rate. As another example, the nominal value adjustment rate may be substantially equivalent to a fraction, such as one-half, of the feedback rate.

In yet another example, four outcome values may correspond to a single perturbation cycle. For example, four outcome values may be represented by one of sixteen possible outcome sequences (0000, 0001, 0010, 0011, 0100, 0101, 0110, 0111, 1000, 1001, 1010, 1011, 1100, 1101, 1110, 1111), where the first two bits may represent the outcome values associated with the first modulation in the perturbation cycle and the last two bits may represent the outcome values associated with the second modulation in the perturbation cycle.

Modifications, additions, or omissions may be made to communication network 10 without departing from the scope of the invention. Additionally, operations of communication network 10 may be performed using any suitable logic. Additional details of examples of embodiments of the invention are described in greater detail below in conjunction with portions of FIG. 2, FIG. 3, FIG. 4, FIG. 5, and FIG. 6. As used in this document, "each" refers to each member of a set or each member of a subset of a set. A subset of a set may include none, some, or all elements of the set.

The embodiments of perturbation techniques illustrated in FIGS. 2 through 5 apply to phase perturbations. Other embodiments of the perturbation techniques, however, may apply to perturbations of other values such as relative amplitude, absolute power, frequency, timing, other suitable signal feature that may be modulated, or any combination of the preceding.

Figure 2:
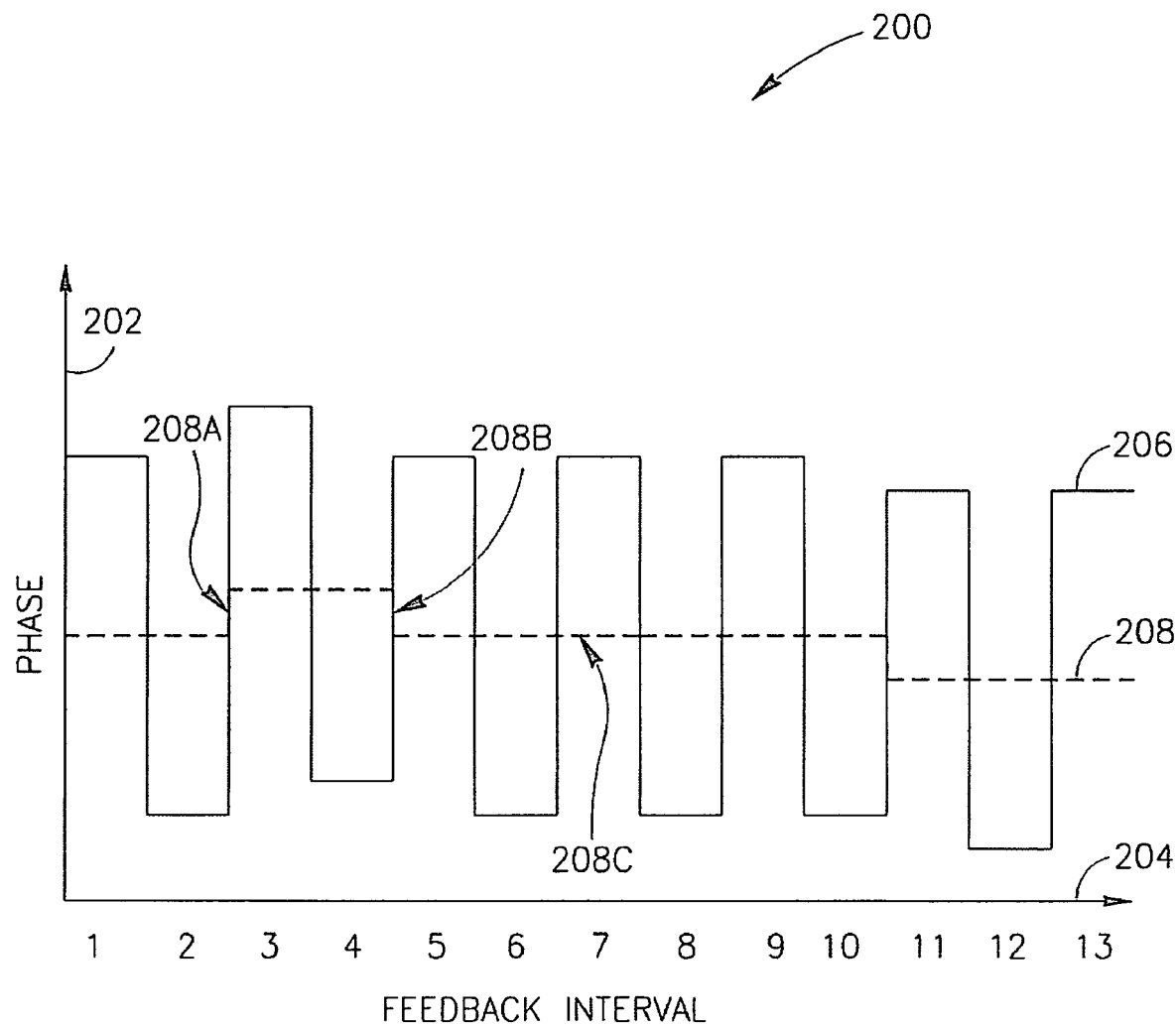
FIG. 2 is a graph illustrating one embodiment of a full rate perturbation technique that may be used by the modifying communication device of FIG. 1.

FIG. 2 is a graph 200, plotting phase on axis 202 and feedback interval on axis 204, illustrating one embodiment of a non-continuous full rate perturbation technique that may be used by modifying communication device 20a of FIG. 1. According to the illustrated embodiment, a full rate perturbation technique may refer to a technique where a perturbation rate may be substantially equivalent to the feedback rate, and a nominal value adjustment rate may be substantially equivalent to one-half of the feedback rate. Thus, a perturbation 206 is applied once for every feedback interval, and a nominal value 208 is adjusted once for every two feedback intervals, using two outcomes, with three possible adjustments: adjust up 208a, adjust down 208b, or no change 208c.

Figure 3:
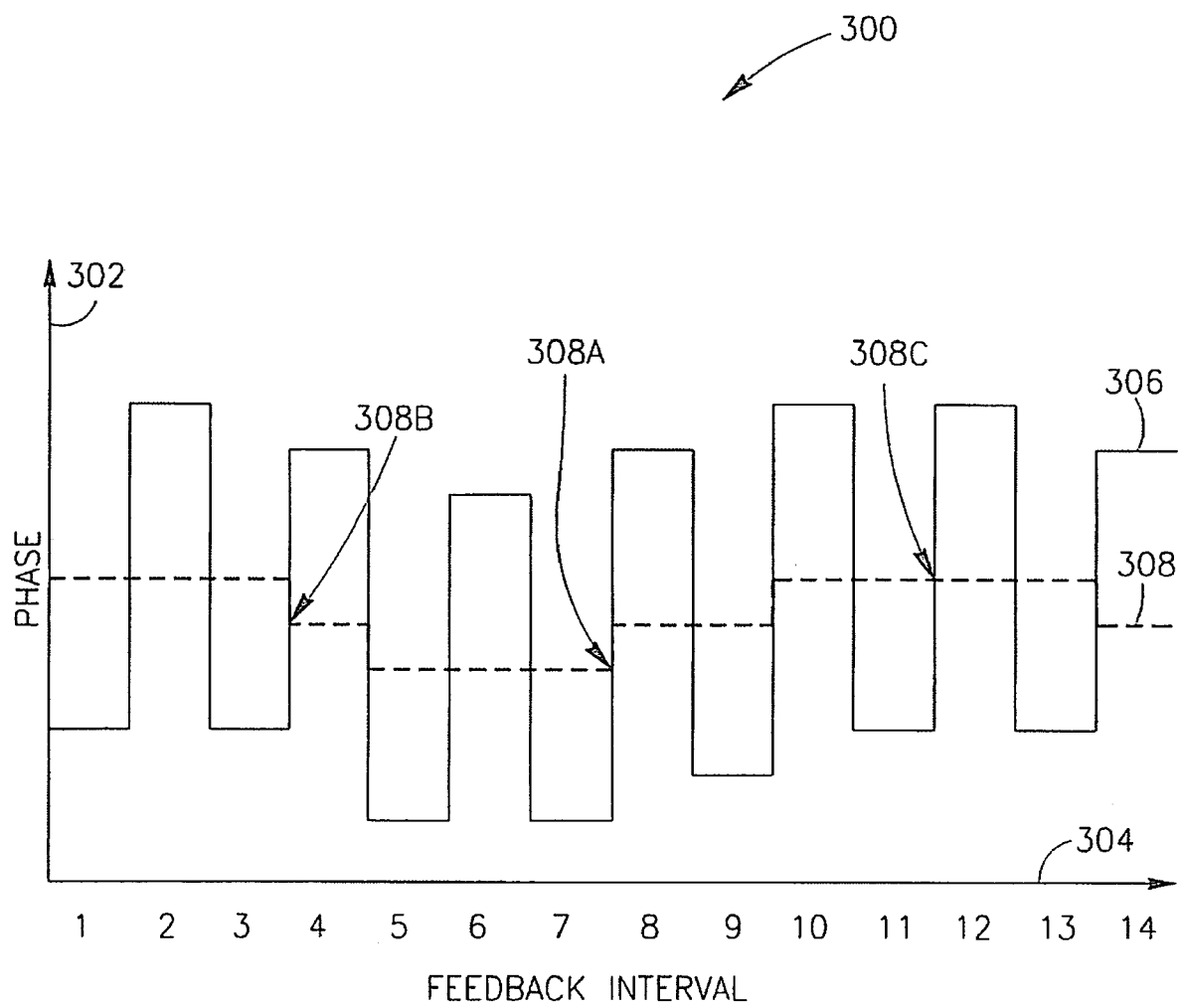
FIG. 3 is a graph illustrating one embodiment of a continuous full rate perturbation technique that may be used by the modifying communication device of FIG. 1.

FIG. 3 is a graph 300, plotting phase on axis 302 and feedback interval on axis 304, illustrating one embodiment of a continuous full rate perturbation technique that may be used by modifying communication device 20a of FIG. 1. According to the illustrated embodiment, a continuous full rate perturbation technique may refer to a technique where a perturbation rate may be substantially equivalent to the feedback rate and a nominal value adjustment rate may be substantially equivalent to the feedback rate. Thus, a perturbation 306 is applied once for every feedback interval, and a nominal value 308 is adjusted once for every feedback interval, using two outcomes, with three possible decisions: adjust up 308a, adjust down 308b, or no change 308c.

Figure 4:
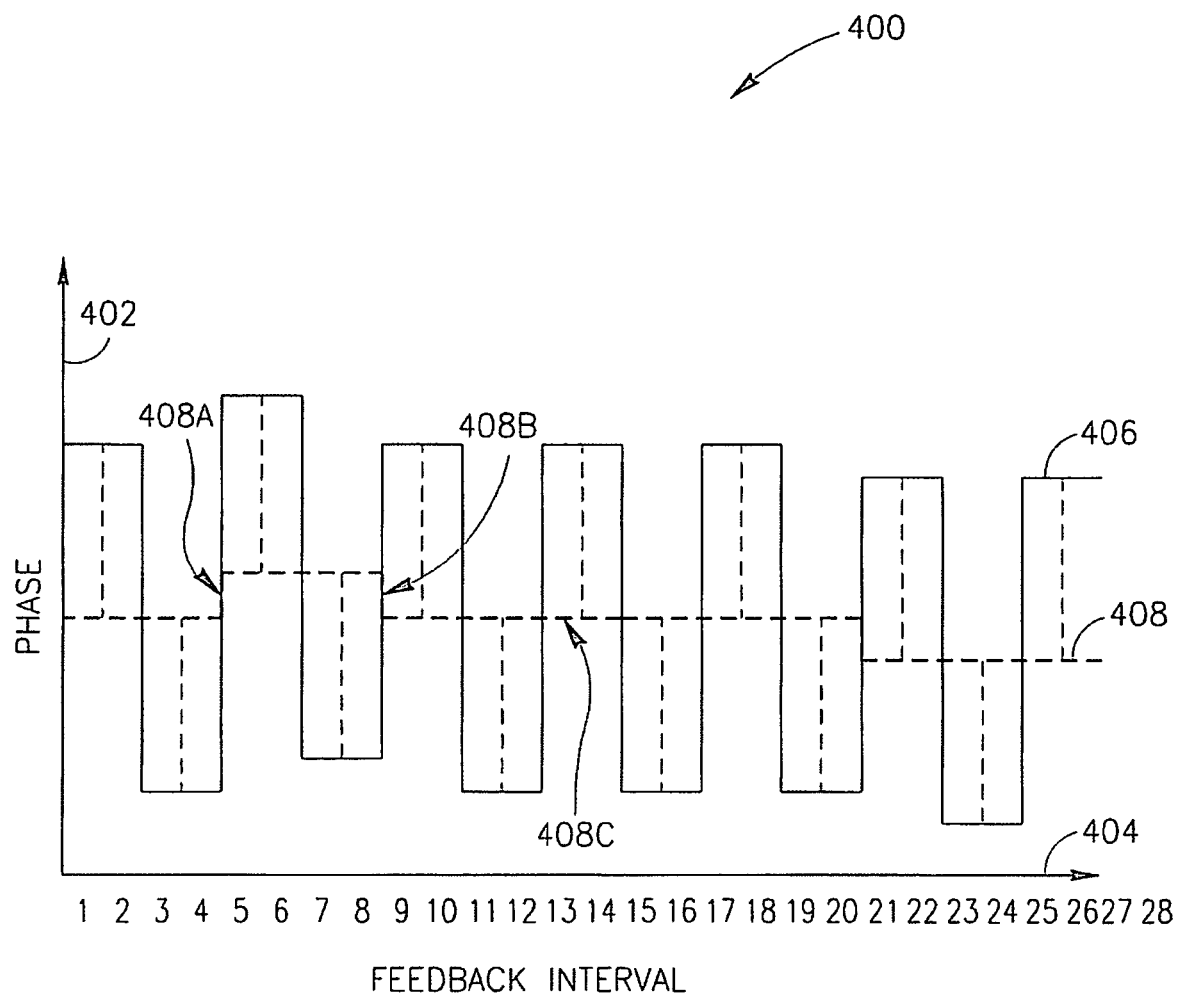
FIG. 4 is a graph illustrating one embodiment of a fractional rate perturbation technique that may be used by the modifying communication device of FIG. 1.

FIG. 4 is a graph 400, plotting phase on axis 402 and feedback interval on axis 404, illustrating one embodiment of a non-continuous fractional rate perturbation technique that may be used by modifying communication device 20a of FIG. 1. According to the illustrated embodiment, the perturbation rate may be substantially equivalent to a fraction of the feedback rate and the nominal value adjustment rate may be substantially equivalent to one-half of the perturbation rate.

According to one embodiment, a perturbation rate may be substantially equivalent to 1/N of the feedback rate, where N represents the number of feedback intervals for each perturbation. The nominal value adjustment rate is substantially equivalent to one-half of the perturbation rate, or 1/2N of the feedback rate.

As an example, FIG. 4 illustrates an embodiment where the perturbation rate is substantially equivalent to one-half of the feedback rate, thus each perturbation is maintained for two feedback intervals. Thus, a perturbation 408 is applied once for every two feedback intervals, and a nominal value 408 is adjusted once for every four feedback intervals with three possible decisions: adjust up 408a, adjust down 408b, or no change 408c.

Figure 5:
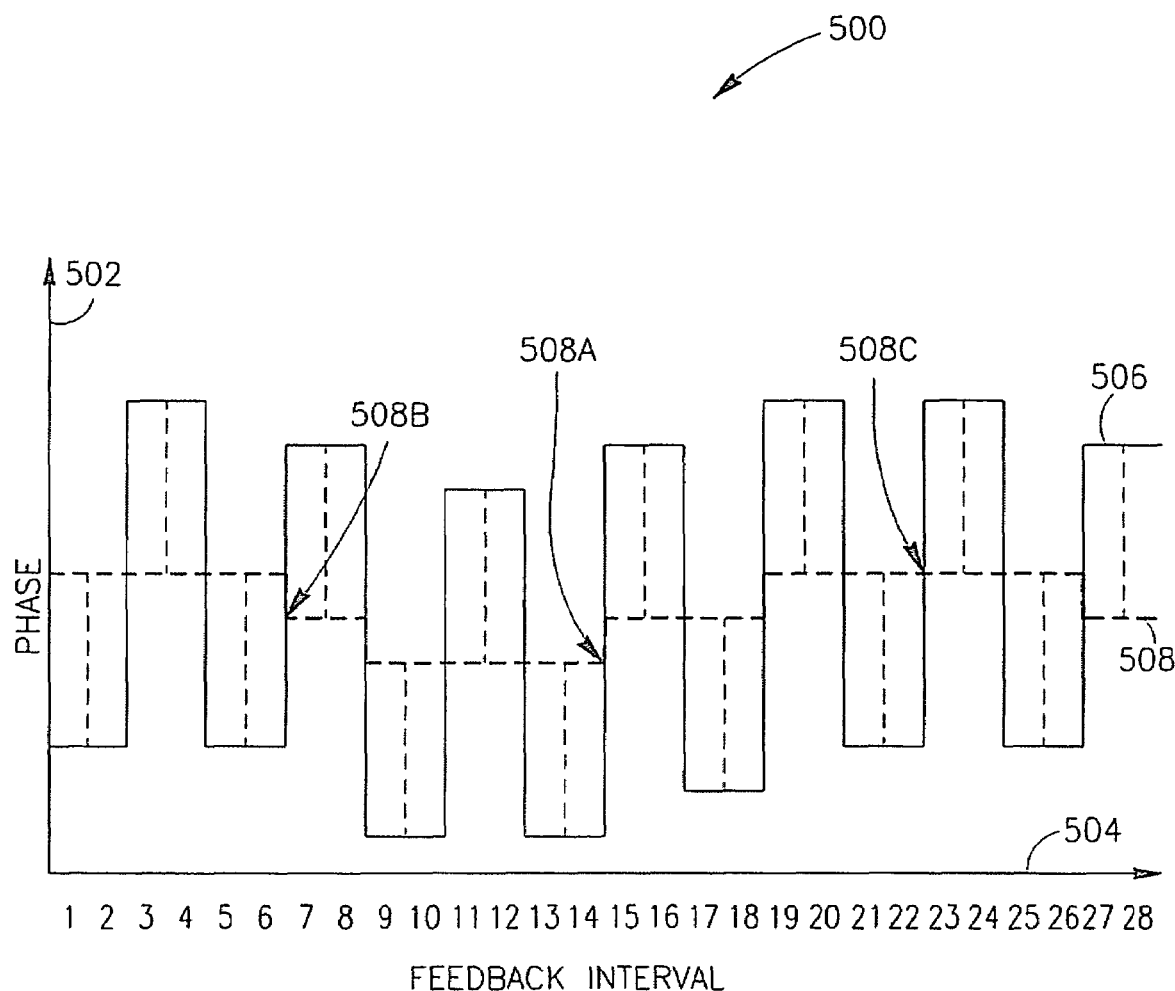
FIG. 5 is a graph illustrating one embodiment of a continuous fractional rate perturbation technique that may be used by the modifying communication device of FIG. 1.

FIG. 5 is a graph 500, plotting phase on axis 502 and feedback interval on axis 504, illustrating one embodiment of a continuous fractional rate perturbation technique that may be used by modifying communication device 20a of FIG. 1. According to the illustrated embodiment, a continuous fractional rate perturbation technique may refer to a technique where a perturbation rate may be substantially equivalent to a fraction of the feedback rate and a nominal value adjustment rate may be substantially equivalent to the perturbation rate. As an example, FIG. 5 illustrates an embodiment where the perturbation rate is substantially equivalent to one-half of the feedback rate, thus each perturbation is maintained for two feedback intervals. Thus, a perturbation 506 is modulated once for every two feedback intervals, and nominal value 508 is adjusted once for every two feedback intervals, using four outcomes, with three possible decisions: adjust up 508a, adjust down 508b, or no change 508c.

Figure 6:
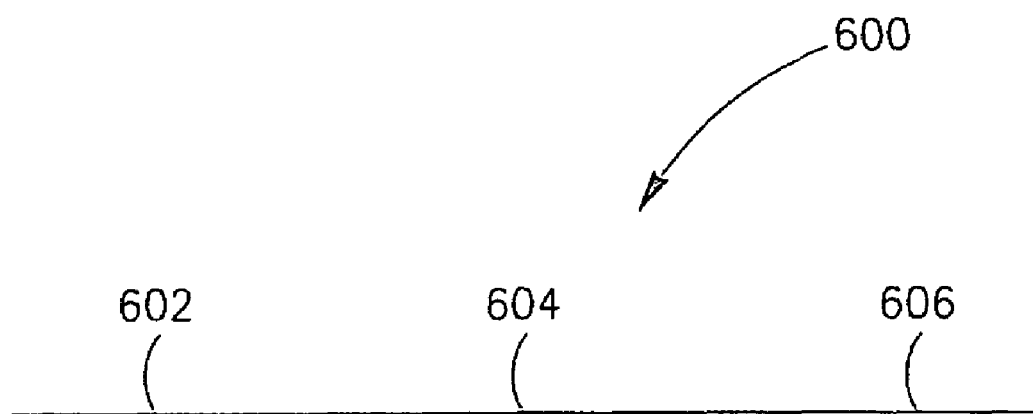
FIG. 6 is a table illustrating example nominal value adjustments that may be made in response to example outcome values.

FIG. 6 is a table 600 illustrating example nominal value adjustments that may be made in response to example outcome values. Outcome values 602 may be converted to feedback values 604, and used to calculate a grade 606 for a nominal value adjustment. In the embodiment, the perturbation rate is substantially equivalent to one-half of the feedback rate, so four outcome values correspond to a perturbation cycle. The four outcome values may be represented by a four bit outcome sequence. The bits may be ordered according to the time they are received, with the leftmost bit reflecting the oldest outcome. The first two (left-hand side) bits correspond to a first, or previous, perturbation. The second two (right-hand side) bits correspond to a second, or subsequent, perturbation. For example, in the outcome sequence 1011, the first two bits indicate a "quality up" and a "quality down" for the first perturbation, and the second two bits of outcome sequence 1011 indicate a "quality up" and a "quality up" for the second perturbation.

Different outcome values may yield different nominal value adjustments. For example, outcome values indicating better quality in a particular direction may yield an adjustment in that direction. For example, outcome sequences 1011, 0001, and 0011 may result in a nominal value adjustment generally in the direction of the second perturbation, and outcome sequences 0100, 1100, and 1110 may result in a nominal value adjustment generally in the direction of the first perturbation. Other outcome sequences may produce no change in the nominal value.

As another example, outcome sequences 0001, 0010, and 0111 may result in a nominal value adjustment generally in the direction of the second perturbation, and outcome sequences 1000 and 1101 may result in a nominal value adjustment generally in the direction of the first perturbation. Other outcome sequences may produce no change in the nominal value.

The adjustments may be of different degrees, for example, small and large adjustments or small, medium, and large adjustments. According to one embodiment, a larger adjustment may be made in response to outcome values indicating a greater difference between the qualities of the directions.

In one example, the adjustments may provide for varying degrees of resolution, for example, adjustment may be small, medium, or large. In the example, outcome sequence 0011 may represent two quality down measurements in the direction of the first perturbation and two quality up measurements in the direction of the second perturbation, and hence, the sequence may result in a large nominal value adjustment in the direction of the second perturbation. Likewise, outcome sequence 1100 may result in a large nominal value adjustment in the direction of the first perturbation. Less decisive outcome sequences, for example, outcome sequences 0001 and 1011 may result in a medium nominal value adjustment in the direction of the second perturbation, and outcome sequences 0100 and 1110 may result in a medium nominal value adjustment in the direction of the first perturbation. Outcome sequences 0010 and 0111 may result in a small nominal value adjustment in the direction of the second perturbation, and outcome sequences 1000 and 1101 may result in a small nominal value adjustment in the direction of the first perturbation. Thus, for example, in the case above, the method may take into account a trend in response to the perturbation. For example, an outcome sequence of 1011 may indicate that in response to the perturbation in the first direction, the feedback communication device first reports quality up and then quality down, resulting in medium adjustment: whereas an outcome sequence of 0111 may indicate that in response to the perturbation in the first direction, the feedback communication device first reports quality down and then quality up, thus resulting in a small adjustment. Other outcome sequences that produce an ambiguous measurement, for example, where the quality readings for the first and second perturbation are equivalent, may produce no change in the nominal value.

According to one embodiment, a grade that indicates a nominal value adjustment for an outcome sequence may be calculated from the bits of the outcome sequence. The grade may be calculated in any suitable manner. According to one embodiment, a weight $W_i$ may be assigned to each separate feedback interval, where the weight $W_i$ is applied to a feedback value $F_i$. According to the embodiment, a bit of an outcome sequence may have a feedback value $F_i$. For example, bit 0 may correspond to a feedback value of +1, and bit 1 may correspond to a feedback value of −1. In an example, weights $W_1$, $W_2$, $W_3$, and $W_4$, such as $W_1=-1$, $W_2=-2$, $W_3=+1$, and $W_4=+2$, may be applied to a four-bit outcome sequence with feedback values $F_1$, $F_2$, $F_3$, and $F_4$.

A grade G may be computed for each outcome sequence as $G=C*\Sigma(F_i*W_i)$. Constant C may have any suitable value, for example, C=0.5. Each grade may be associated with a specific nominal value adjustment. For example, grades of −3 and +3 may yield a large nominal value adjustment, grades of −2 and +2 may yield a medium nominal value adjustment, and grades of −1 and +1 may yield a small nominal value adjustment. Outcome sequences with grades such as 0 may produce no change in the nominal value.

Figure 7:
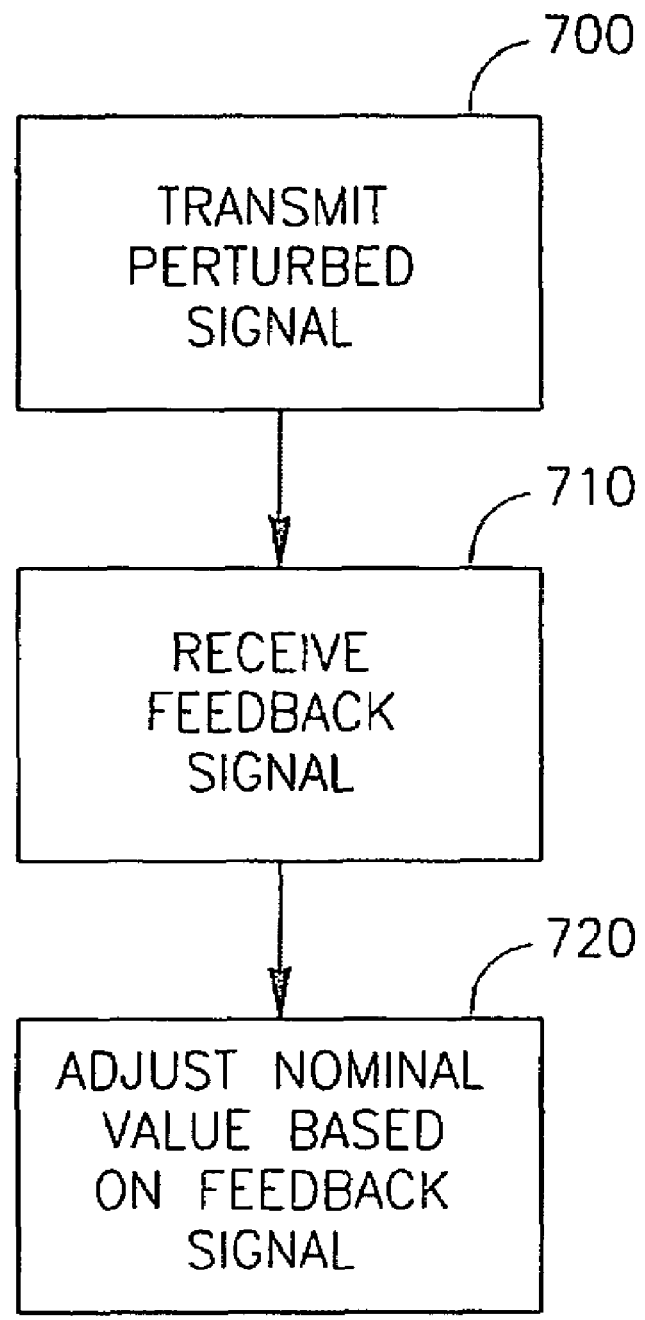
FIG. 7 is a block diagram showing a method in accordance with embodiments of the present invention.

FIG. 7 is a block diagram showing a method in accordance with embodiments of the present invention. At block 700, a perturbed signal is transmitted. As described above, in one embodiment of the invention, the perturbation may include modulation of the nominal value of a transmit diversity parameter in a first direction and modulation of the nominal value of the transmit diversity parameter in a second direction. At block 710, a feedback signal is received that includes feedback information pertaining to the quality of the received signal. The feedback signal may relate to one or more perturbed signals or perturbation cycles. At block 720, the nominal value of the transmit diversity parameter may be adjusted based on the feedback signal. It will be recognized that the adjustment may be made based on one or more feedback signals, and that in the latter case, some feedback signals may be used in one or more than one nominal value adjustment decision. Thus, for example, if the feedback signal indicates an improvement in the signal received using perturbation modulation in a first direction as compared to the signal received using perturbation modulation in the second direction, the next nominal value adjustment may be made in the direction showing improved quality. It will be understood that the method shown in FIG. 7 is an oversimplification of a single perturbation step. In embodiments of the invention, perturbations are typically pipelined, e.g., subsequent perturbation cycles may be transmitted well before the feedback is received and decisions made based on that feedback. Moreover, in embodiments of the invention, the steps may take place in parallel. Thus, for example, a perturbation may be transmitted even while an adjustment is being calculated.

It will be understood that while embodiments of the invention described herein discuss continuous and/or non-continuous modes of adjusting nominal value in transmit diversity systems by perturbation of a signal according to the adjusted nominal value at a perturbation rate, similar continuous and/or non-continuous nominal value adjustment decisions may be applied to adjust the nominal values of parameters based on any feedback signal provided by the feedback communication device, even if the nominal value was not perturbed.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for modifying a signal transmitted from a mobile modifying communication device to a feedback communication device, comprising:
   perturbing in the mobile modifying communication device a transmit diversity parameter from its nominal value at a perturbation rate by modulating the transmit diversity parameter with respect to the nominal value in a first direction for a first feedback interval and then modulating the transmit diversity parameter with respect to the nominal value in a second direction for a second feedback interval;
   receiving from the feedback communication device a signal quality feedback signal according to a communication protocol, the feedback signal including feedback information relating to the quality of the perturbed signal as received at said feedback communication device; and
   based at least on said feedback information, adjusting at the mobile modifying communication device the nominal value of the transmit diversity parameter,
   wherein said transmit diversity parameter comprises a parameter selected from a group consisting of: relative phase, relative amplitude, relative power, and timing of said signal.

2. The method of claim 1, wherein adjusting a nominal value of a transmit diversity parameter comprises a step selected from the group consisting of:
   adjusting the nominal value in a first direction,
   adjusting the nominal value in a second direction, said second direction opposite to said first direction, and
   preserving the nominal value.

3. The method of claim 2, wherein said steps of adjusting the nominal value comprise adjusting the nominal value in a variable amount, said variable amount based on said feedback information.

4. The method of claim 1, wherein said transmit diversity parameter comprises a parameter selected from the group consisting of: relative phase, relative amplitude, and relative power of said signal.

5. The method of claim 1, wherein the transmit diversity parameter is relative phase, and wherein adjusting the nominal value of said transmit diversity parameter comprises:
   identifying a center value of a relative phase of the signal; and
   adjusting the center value at a nominal value adjustment rate.

6. The method of claim 1, wherein the transmit diversity parameter is relative amplitude, and wherein adjusting the nominal value of said transmit diversity parameter comprises:
   identifying a center value of a relative amplitude of the signal; and
   adjusting the center value at a nominal value adjustment rate.

7. The method of claim 1, wherein said feedback information comprises an outcome sequence including at least one feedback value, each said feedback value comprising one or more bits, and wherein adjusting a nominal value of a transmit diversity parameter comprises:
   calculating a grade from the one or more feedback values, the grade indicating a nominal value adjustment.

8. The method of any of claims 1-3 and 4-7, wherein adjusting the nominal value of said transmit diversity parameter comprises adjusting the nominal value of said transmit diversity parameter at a nominal value adjustment rate, and wherein receiving said signal quality feedback signal comprises receiving said signal quality feedback signal at a feedback rate, and wherein said nominal value adjustment rate is substantially equivalent to the feedback rate.

9. The method of any of claims 1-3 and 4-7, wherein adjusting the nominal value of said transmit diversity parameter comprises adjusting the nominal value of said transmit diversity parameter at a nominal value adjustment rate, and wherein receiving said signal quality feedback signal comprises receiving said signal quality feedback signal at a feedback rate, and wherein said nominal value adjustment rate is a fraction of the feedback rate.

10. The method of claim 9, wherein adjusting the nominal value of said transmit diversity parameter comprises adjusting the nominal value based on a plurality of feedback signals.

11. The method of any of claims 1-3 and 4-7, wherein receiving said signal quality feedback signal comprises receiving said signal quality feedback signal at a feedback rate, and wherein said perturbation rate is substantially equivalent to the feedback rate.

12. The method of any of claims 1-3 and 4-7, wherein receiving said signal quality feedback signal comprises receiving said signal quality feedback signal at a feedback rate, and wherein said perturbation rate is a fraction of the feedback rate.

13. The method of claim 12, wherein adjusting the nominal value of said transmit diversity parameter comprises adjusting the nominal value based on a plurality of feedback signals.

14. The method of any of claims 1-3 and 4-7, wherein adjusting the nominal value of said transmit diversity parameter comprises adjusting the nominal value of said transmit diversity parameter at a nominal value adjustment rate, wherein said nominal value adjustment rate is substantially equivalent to the perturbation rate.

15. The method of any of claims 1-3 and 4-7, wherein adjusting the nominal value of said transmit diversity parameter comprises adjusting the nominal value of said transmit diversity parameter at a nominal value adjustment rate, wherein said nominal value adjustment rate is a fraction of the perturbation rate.

16. The method of claim 15, wherein adjusting the nominal value of said transmit diversity parameter comprises adjusting the nominal value based on a plurality of feedback signals.

17. A mobile modifying communication device for adjusting a nominal value of a transmit diversity parameter comprising:
  a processor in the mobile modifying communication device to perturb a transmit diversity parameter of a signal from its nominal value at a perturbation rate by modulating the signal with respect to the nominal value in a first direction for a first feedback interval, and modulating the signal with respect to the nominal value in a second direction for a second feedback interval, and to adjust the nominal value of the transmit diversity parameter based at least on a signal quality feedback signal received at-a from a feedback communication device according to a communication protocol, the feedback signal including feedback information relating to the quality as received at said feedback communication device of the perturbed signal transmitted by said mobile modifying communication device,
  wherein said transmit diversity parameter comprises a parameter selected from a group consisting of: relative phase, relative amplitude, relative power, and timing of said signal.

18. The device of claim 17, further comprising:
  a transceiver to transmit said perturbed signal and to receive said feedback signal.

19. The device of claim 17, wherein said processor is further to perturb said signal from its nominal value at a perturbation rate.

20. The device of claim 17, wherein the processor is to adjust the nominal value of a transmit diversity parameter by a step selected from the group consisting of:
  adjusting the nominal value in a first direction,
  adjusting the nominal value in a second direction, said second direction opposite to said first direction, and
  preserving the nominal value.

21. The device of claim 20, wherein the processor is to adjust the nominal value in a variable amount based on said feedback information.

22. The method of claim 18, wherein said transmit diversity parameter comprises a parameter selected from the group consisting of: relative phase, relative amplitude, and relative power of said signal.

23. The device of claim 18, wherein said feedback information comprises an outcome sequence including at least one feedback value, each said feedback value comprising one or more bits, and wherein adjusting a nominal value of a transmit diversity parameter comprises:
  calculating a grade from the one or more feedback values, the grade indicating a nominal value adjustment.

24. A communication system comprising:
  a mobile modifying communication device to transmit a signal having a transmit diversity parameter perturbed from its nominal value, wherein said modifying communication device is to perturb the signal by modulating the transmit diversity parameter with respect to the nominal value in a first direction for a first feedback interval and modulating the transmit diversity parameter with respect to the nominal value in a second direction for a second feedback interval;
  a feedback communication device to receive said perturbed signal and to transmit a signal quality feedback signal at a feedback rate, said feedback signal comprising feedback information relating to receipt of the perturbed signal at the feedback communication device, said signal quality feedback signal according to a communication protocol,
  wherein said mobile modifying communication device is further to receive said feedback signal, and based at least on said feedback information, to adjust a nominal value of a transmit diversity parameter,
  wherein said transmit diversity parameter comprises a parameter selected from a group consisting of: relative phase, relative amplitude, relative power, and timing of said signal.

25. The system of claim 24, wherein said modifying communication device is to adjust a nominal value by performing a step selected from the group consisting of:
  adjusting the nominal value in a first direction,
  adjusting the nominal value in a second direction, said second direction opposite to said first direction, and
  preserving the nominal value.

26. The system of claim 24, wherein said transmit diversity parameter comprises a parameter selected from the group consisting of: relative phase, relative amplitude, and relative power of said signal.

27. The system of claim 24, wherein the transmit diversity parameter is relative phase, and wherein said modifying communication device is to adjust the nominal value of said transmit diversity parameter by:
  identifying a center value of a relative phase of the signal; and
  adjusting the center value at a nominal value adjustment rate.

28. The system claim 24, wherein the transmit diversity parameter is relative amplitude, and wherein said modifying communication device is to adjust the nominal value of said transmit diversity parameter by:
  identifying a center value of a relative amplitude of the signal; and
  adjusting the center value at a nominal value adjustment rate.

29. The system of claim 24, wherein said feedback information comprises an outcome sequence including at least one feedback value, each said feedback value comprising one or more bits, and wherein said modifying communication device is to adjust a nominal value of a transmit diversity parameter by:
  calculating a grade from the one or more feedback values, the grade indicating a nominal value adjustment.

30. A method for modifying a signal transmitted from a mobile modifying communication device to a feedback communication device, comprising:
  perturbing in the mobile modifying communication device a transmit diversity parameter from its nominal value at a perturbation rate by modulating the transmit diversity parameter with respect to the nominal value in a first direction for a first feedback interval and then modulating the transmit diversity parameter with respect to the nominal value in a second direction for a second feedback interval;

receiving at said mobile modifying communication device a feedback signal from the feedback communication device, the feedback signal providing signal quality feedback information for the quality of the perturbed signal as received at said feedback communication device at a feedback rate, the feedback signal comprising:

one or more first power control bit outcome values reflecting the power of the signal during the first feedback interval and one or more second power control bit outcome values reflecting the power of the signal during the second feedback interval and adjusting at said mobile modifying communication device a nominal value of a transmit diversity parameter in accordance with the one or more first outcome values and the one or more second outcome values wherein said transmit diversity parameter comprises a parameter selected from a group consisting of: relative phase, relative amplitude, relative power, and timing of said signal.

31. The method of claim 1, wherein said signal quality feedback signal received according to said communication protocol is a power control bit.

32. The method of claim 1, comprising:

wherein perturbing said signal comprises perturbing said signal over a plurality of feedback time periods; and wherein receiving said signal quality feedback signal comprises receiving said signal quality feedback signal from the feedback communication device for each quality feedback time period from said plurality of feedback time periods.

33. The mobile modifying communication device of claim 17, wherein said signal quality feedback signal received according to said communication protocol is a power control bit.

34. The mobile modifying communication device of claim 17, wherein said processor is to perturb said signal by perturbing said signal over a plurality of feedback time periods, to receive said signal quality feedback signal by receiving a plurality of said signal quality feedback signals from the feedback communication device respectively for each quality feedback time period from said plurality of feedback time periods, and to adjust said nominal value based on said plurality of signal quality feedback signals.

35. The communication system of claim 24, wherein said signal quality feedback signal according to the communication protocol is a power-control bit.

36. The communication system of claim 24, wherein said mobile modifying communication device is to transmit said signal perturbed from its nominal value over a plurality of feedback time periods, wherein said feedback communication device is to receive said perturbed signal over said plurality of feedback time periods, and to transmit a plurality of signal quality feedback signals at a feedback rate respectively for said plurality of quality feedback time periods, and wherein said mobile modifying communication device is further to adjust said nominal value of said transmit diversity parameter based on said plurality of signal quality feedback signals.

37. The method of claim 1, further comprising repeating the steps of perturbing the transmit diversity parameter and receiving the signal quality feedback signal, using the adjusted nominal value of the transmit diversity parameter.

38. The mobile modifying communication device of claim 17, wherein said processor is to repeat the step of perturbing the transmit diversity parameter using the adjusted nominal value.

39. The communication system of claim 24, wherein said mobile modifying communication device is to repeat the steps of perturbing the transmit diversity parameter and receiving the signal quality feedback signal, using the adjusted nominal value of the transmit diversity parameter.

* * * * *